United States Patent
Seydel et al.

(10) Patent No.: US 12,332,464 B2
(45) Date of Patent: Jun. 17, 2025

(54) OPTICAL DEVICE WITH AT LEAST ONE INFRARED REFLECTIVE MATERIAL

(71) Applicant: VIAVI SOLUTIONS INC., San Jose, CA (US)

(72) Inventors: Johannes P. Seydel, Petaluma, CA (US); John Edward Book, Santa Rosa, CA (US); Alberto Argoitia, Santa Rosa, CA (US); Kangning Liang, Santa Rosa, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 327 days.

(21) Appl. No.: 17/158,865

(22) Filed: Jan. 26, 2021

(65) Prior Publication Data

US 2022/0236464 A1    Jul. 28, 2022

(51) Int. Cl.
*G02B 5/20* (2006.01)
*B29D 11/00* (2006.01)
*G02B 5/02* (2006.01)
*G02B 5/26* (2006.01)

(52) U.S. Cl.
CPC .......... *G02B 5/208* (2013.01); *B29D 11/0074* (2013.01); *G02B 5/0242* (2013.01); *G02B 5/26* (2013.01); *G02B 2207/101* (2013.01)

(58) Field of Classification Search
CPC ........ G02B 5/208; G02B 5/0242; G02B 5/26; G02B 5/20; G02B 5/206; G02B 5/0236; G02B 5/28–282; G02B 2207/101; B29D 11/0074
See application file for complete search history.

(56) References Cited

U.S. PATENT DOCUMENTS

| | | | |
|---|---|---|---|
| 6,366,397 B1 | 4/2002 | Genjima et al. | |
| 2003/0030041 A1 | 2/2003 | Genjima et al. | |
| 2004/0068046 A1 | 4/2004 | Hugo | |
| 2005/0207017 A1 | 9/2005 | Wolfe | |
| 2010/0025641 A1* | 2/2010 | Jimbo | G02B 5/208 252/587 |
| 2010/0047620 A1 | 2/2010 | Decker et al. | |
| 2012/0107584 A1 | 5/2012 | Eibon et al. | |
| 2013/0288027 A1* | 10/2013 | Richter | C08J 7/0427 427/160 |
| 2015/0004424 A1* | 1/2015 | Kruesemann | C09D 5/004 524/40 |
| 2016/0320875 A1* | 11/2016 | Yoshida | G06F 3/042 |
| 2017/0205546 A1* | 7/2017 | Wada | G02B 5/208 |
| 2017/0261661 A1* | 9/2017 | Kiyoto | G02B 5/12 |
| 2017/0349828 A1* | 12/2017 | Katoh | C08F 228/00 |

(Continued)

FOREIGN PATENT DOCUMENTS

| | | |
|---|---|---|
| CN | 102590906 A | 7/2012 |
| CN | 103221491 A1 | 7/2013 |

(Continued)

*Primary Examiner* — Stephone B Allen
*Assistant Examiner* — Adam W Booher
(74) *Attorney, Agent, or Firm* — Mannava & Kang, P.C.

(57) ABSTRACT

An optical device, including a first selective light modulator layer comprising infrared transparent particles; and at least one infrared reflective material chosen from an infrared reflective layer and a plurality of infrared reflective particles is disclosed. A method of making the optical device is also disclosed.

11 Claims, 5 Drawing Sheets

(56) References Cited

U.S. PATENT DOCUMENTS

2017/0371091 A1* 12/2017 Seydel ................. G02B 6/0055
2019/0350399 A1   11/2019 Abayasinghe et al.
2020/0353720 A1* 11/2020 Cui ........................ B32B 3/26

FOREIGN PATENT DOCUMENTS

| CN | 102289018 A | 12/2013 | | |
|----|-------------|---------|---|---|
| CN | 106104431 A | 11/2016 | | |
| CN | 106461825 A | 2/2017 | | |
| CN | 107544105 A | 1/2018 | | |
| CN | 107209304 A | 6/2020 | | |
| EP | 3531175 A1 | 8/2019 | | |
| JP | 2004162020 A | * | 6/2004 | ........... C03C 17/007 |

\* cited by examiner

OPTICAL DEVICE WITH AT LEAST ONE INFRARED REFLECTIVE MATERIAL

FIELD OF THE INVENTION

The present disclosure generally relates to an optical device, comprising a first selective light modulator layer comprising infrared transparent particles; and at least one infrared reflective material chosen from an infrared reflective layer and a plurality of infrared reflective particles. A method of making the optical device is also disclosed.

BACKGROUND OF THE INVENTION

Infrared light is increasingly being used in everyday technology, such as thermometers and remote controls. In some applications, infrared light is selectively reflected away from objects. Selectively reflecting infrared light can reflect heat away from an object, recognize stationary and moving objects with LIDAR, provide decorative colors with additional heat reflection properties, and can reduce a carbon footprint of vehicles, etc. In other application, infrared light can be selectively be transmitted in the radar range for use in automobiles.

What is needed is an optical device with selective and transmissive properties that can be designed to match a desired appearance, performance, and directional properties of reflected and transmitted light: oriented or Lambertian.

SUMMARY OF THE INVENTION

In an aspect, there is disclosed an optical device, comprising a first selective light modulator layer comprising infrared transparent particles; and at least one infrared reflective material chosen from an infrared reflective layer and a plurality of infrared reflective particles.

In another aspect, there is disclosed a method of making an optical device including depositing, on a substrate, at least one infrared reflective material chosen from an infrared reflective layer and a plurality of infrared reflective particles; and depositing onto the at least one infrared reflective material a first selective light modulating layer including infrared transparent particles.

In another aspect, there is disclosed a method of making an optical device including depositing, on a substrate, a carrier including particles; drying the carrier including particles to form a microstructured layer; applying an infrared reflective layer to the dried microstructured layer; and depositing a first selective light modulating layer to the infrared reflective layer.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

In its broad and varied embodiments, disclosed herein is an optical device, comprising: a first selective light modulator layer comprising infrared transparent particles; and at least one infrared reflective material chosen from an infrared reflective layer and a plurality of infrared reflective particles. The disclosed optical device can be designed to match desired appearance and functional properties, such as selective reflectance of light, e.g., in the infrared range.

Figure 1:
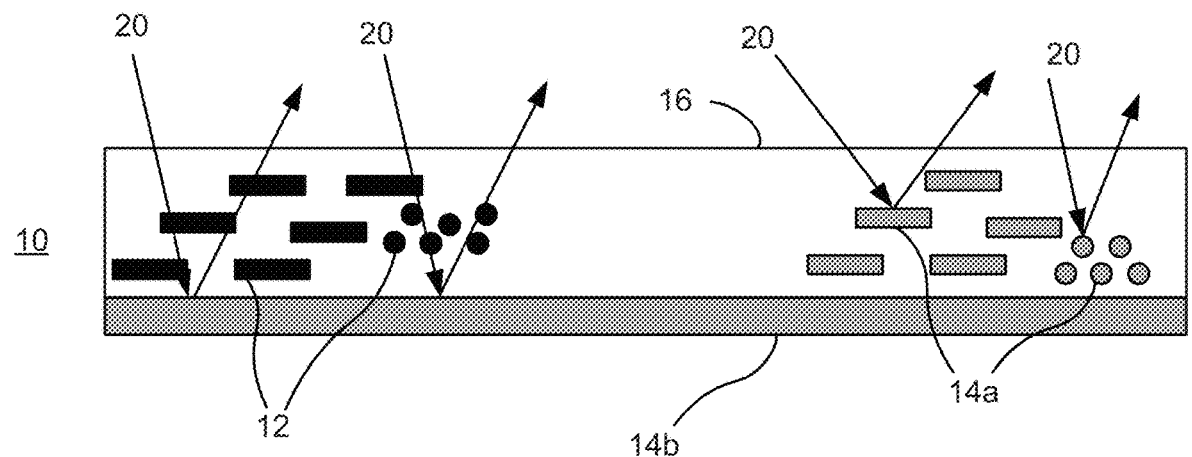
FIG. 1 illustrates a cross-section of an optical device according to an aspect of the invention.
Figure 6A:
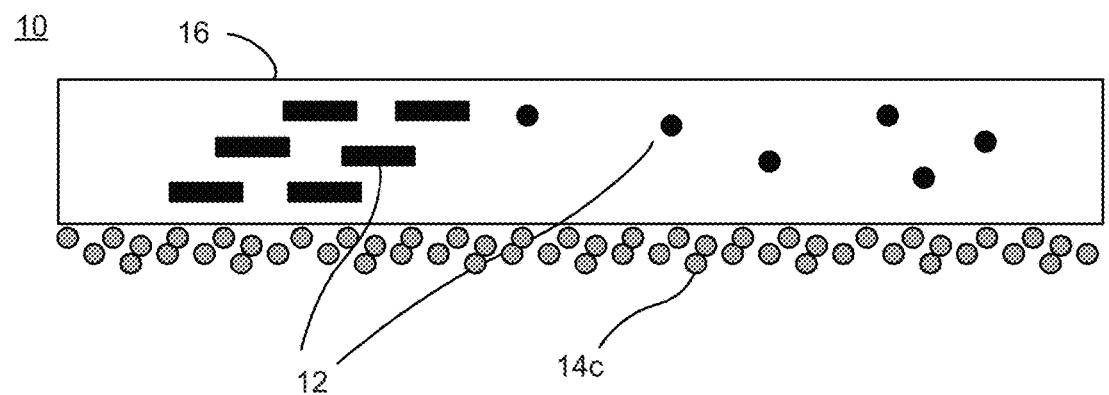
FIGS. 6A-B illustrates a cross-section of an optical device according to another aspect of the invention.
Figure 6B:
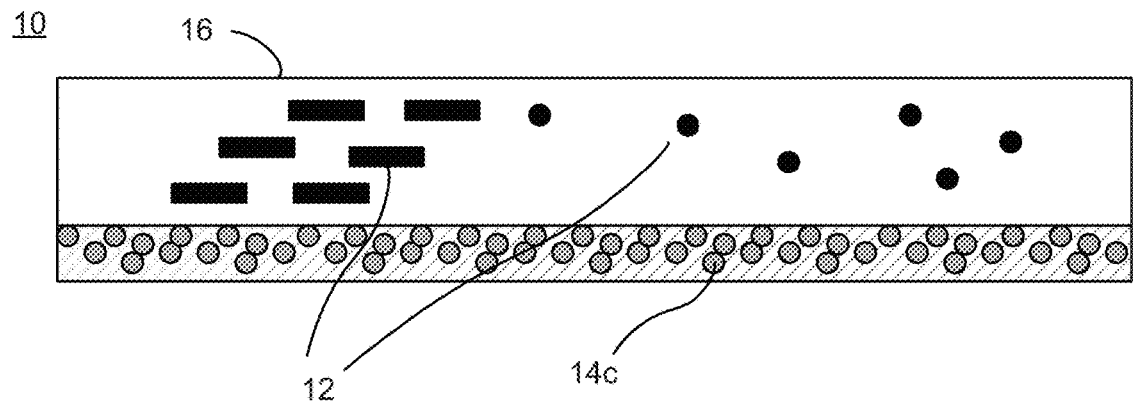

The optical device 10 can selectively transmit and/or reflect light, such as light in an infrared wavelength. The optical device 10 can reflect light in a specific direction (oriented, as shown in FIG. 1) or can scatter light (Lambertian), such as a diffusive reflector. The optical device 10 can be a diffusive reflector, such as shown in FIGS. 6A-B and & 7. The optical device 10 can control the transmission of Radar K and W bands, which can be used for automotive short and long range radar sensors while having a metallic or colored metallic appearance.

The optical device 10 can be used in applications relating to the infrared wavelength range of light. The optical device 10 can be used in applications relating to light in wavelengths from UV, visible, IR, and radar.

FIG. 1 illustrates an optical device 10 comprising: a first selective light modulator layer 16 comprising infrared transparent particles 12. A selective light modulator layer (SLML) 16 is a physical layer having a plurality of optical functions, such as modulating (absorbing and/or emitting) light intensity. The SLML 16 can be a physical layer that is applied as a liquid film in a liquid coating process. After deposition as a liquid, the SLML 16 can be cured to provide a self-leveled layer.

Because the SLML 16 is applied in a liquid form, it enables a wider variety of materials to be included within the layer. In this manner, the SLML 16 can be designed for specific optical functions. The SLML 16 can include a host material in which various materials can be dispersed. The host material can include an organic polymer, an inorganic polymer, and a combination thereof. Non-limiting examples of the organic polymer include thermoplastics, such as polyesters, polyolefins, polycarbonates, polyamides, polyimides, polyurethanes, acrylics, acrylates, polyvinylesters, polyethers, polythiols, silicones, fluorocarbons, and various co-polymers thereof; thermosets, such as epoxies, polyurethanes, acrylates, melamine formaldehyde, urea formaldehyde, and phenol formaldehyde; and energy curable materials, such as acrylates, epoxies, vinyls, vinyl esters, styrenes, and silanes. Non-limiting examples of inorganic polymers includes silanes, siloxanes, titanates, zirconates, aluminates, silicates, phosphazanes, polyborazylenes, and polythiazyls.

The SLML 16 can include various materials dispersed within the host material, such as the infrared transparent particles 12. Non-limiting examples of additional various materials suitable for use in the SLML 16 include color shifting pigments, dyes, pigments (organic and/or inorganic), quantum dots, micelles, metal oxides, metal sulfides, metal carbonates, metal fluorides, curing agents, coating aids, leveling agents, wetting agents, defoamers, adhesion promoters, antioxidants, UV stabilizers, curing inhibition mitigating agents, antifouling agents, corrosion inhibitors, photosensitizers, secondary crosslinkers, solvents, photoinitiators, oxygen inhibition compositions, sensitizers, and combinations thereof.

The oxygen inhibition mitigation composition can comprise at least one acrylate, for example at least one acrylate monomer and at least one acrylate oligomer. In an aspect, the oxygen inhibition mitigation composition can comprise at least one acrylate monomer and two acrylate oligomers. Non-limiting examples of an acrylate for use in the oxygen inhibition mitigation composition can include acrylates; methacrylates; epoxy acrylates, such as modified epoxy acrylate; polyester acrylates, such as acid functional polyester acrylates, tetra functional polyester acrylates, modified polyester acrylates, and bio-sourced polyester acrylates; polyether acrylates, such as amine modified polyether acrylates including amine functional acrylate co-initiators and tertiary amine co-initiators; urethane acrylates, such aromatic urethane acrylates, modified aliphatic urethane acrylates, aliphatic urethane acrylates, and aliphatic allophanate based urethane acrylates; and monomers and oligomers thereof. In an aspect, the oxygen inhibition mitigation composition can include at least one acrylate oligomer, such as two oligomers. The at least one acrylate oligomer can be selected/chosen from a polyester acrylate and a polyether acrylate, such as a mercapto modified polyester acrylate and an amine modified polyether tetraacrylate. The oxygen inhibition mitigation composition can also include at least one monomer, such as 1,6-hexanediol diacrylate.

The photoinitiator can be a phosphineoxide. The phosphineoxide can include, but is not limited to, a monoacyl phosphineoxide and a bis acyl phosphine oxide. The mono acyl phosphine oxide can be a diphenyl (2,4,6-trimethylbenzoyl)phosphineoxide. The bis acyl phosphine oxide can be a bis (2,4,6-trimethylbenzoyl)phenylphosphineoxide.

The SLML 16 can be a first selective light modulator layer 16a, a second selective light modulator layer 16b, etc. Each SLML 16 can be the same or different. For example, a second SLML 16b can be the same or different from a first SLML 16a. By the "same", it is understood to include all aspects, such as materials, amounts of materials, thickness, etc., are identical. By "different", it is understood to include any variations in any aspect, such as materials, amounts of materials, thickness, etc.

In an aspect, the first SLML 16 can be patterned to form a non-planar surface. The SLML 16 can be deposited with a liquid coating process as a wet film. After curing, the SLML 16 can be patterned, such as by embossing, etc.

The optical device 10 can include infrared transparent particles 12 in the SLML 16. As shown in FIG. 1, the infrared transparent particles can be any shape, such as spherical or platelet, i.e., having an aspect ratio other than 1:1. The infrared transparent particles 12 can be any size so long as they are smaller than a thickness of the SLML 16. Any particle that is transparent in the infrared wavelength can be used in the SLML 16. Non-limiting examples of infrared transparent particles 12 include particles of perylene bisimide, azomethine, Prussian blue, iron oxide, azurite, silicon, antimony, tin oxide, and combinations thereof. Additionally, non-limiting examples include barium fluoride, potassium bromide, caesium iodide, potassium chloride, cadmium telluride, sapphire, calcium fluoride, gallium arsenide, sodium chloride, germanium, fused silica, magnesium fluoride, zinc sulfide, zinc selenide, and combinations thereof. The infrared transparent particles can provide a colored appearance in the visible spectrum.

The infrared transparent particles 12 can be dispersed in the SLML 16, such as within the host material of the SLML 16. As shown in FIG. 1, the infrared transparent particles 12 can allow an infrared incident light 20 to transmit through the SLML 16 and reflect off a layer of infrared reflective material 14b.

The optical device 10 can include at least one infrared reflective material chosen from an infrared reflective layer 14a and a plurality of infrared reflective particles 14b, as shown in FIG. 1. The at least one infrared reflective material can be any material that can reflect light in the infrared wavelength. Non-limiting examples of an infrared reflective material include gold, silver, aluminum, indium tin oxide, metal borides, metal nitrides, metal carbides, and combinations thereof.

The at least one infrared reflective material can be present in any shape or size depending upon the application of the optical device 10 (oriented or diffuse reflector) and the location of the infrared reflective material within the optical device 10, as discussed more fully herein.

Figure 2:
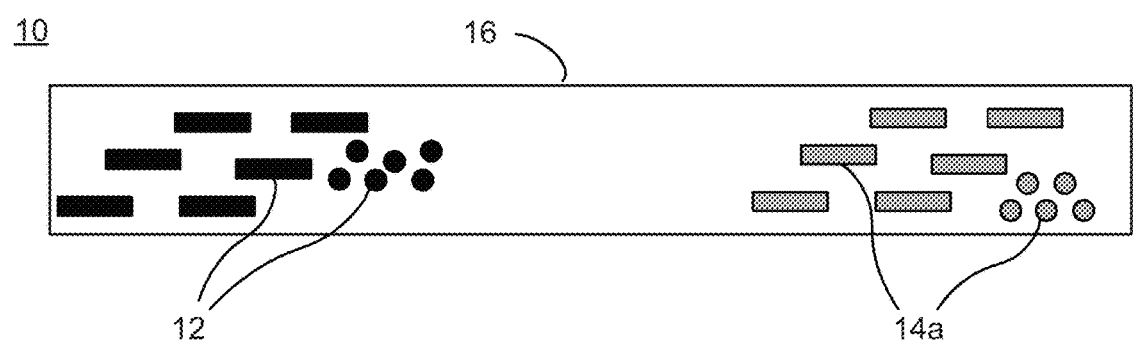
FIG. 2 illustrates a cross-section of an optical device according to another aspect of the invention.
Figure 5:
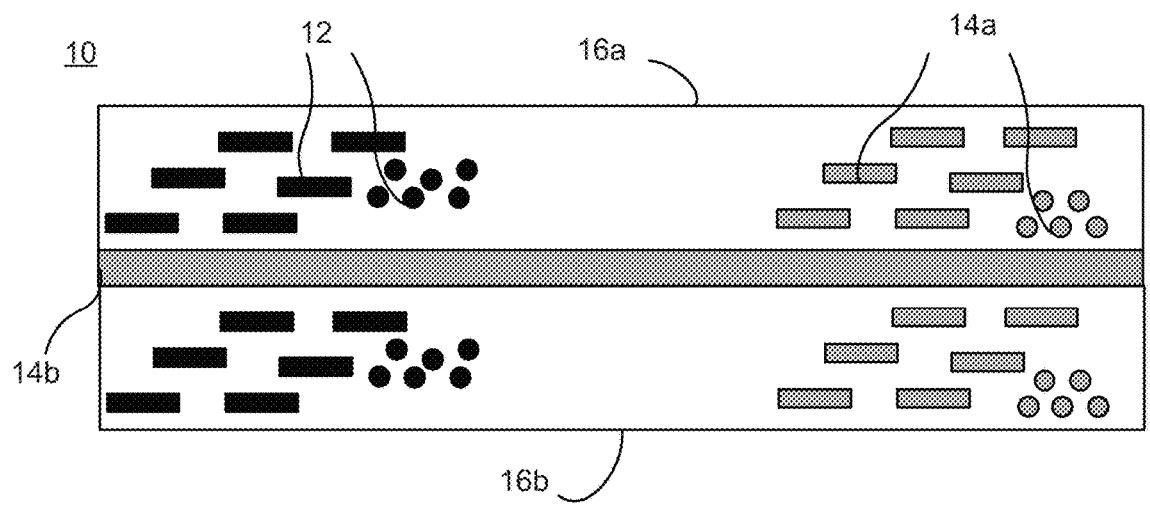
FIG. 5 illustrates a cross-section of an optical device according to another aspect of the invention.

The infrared reflective material can be in the form of platelets and/or particles 14a, such as a plurality of platelets and/or particles dispersed within an SLML 16, as shown in FIGS. 1, 2, and 5. In an aspect, the first SLML 16 can also include a plurality of infrared reflective particles 14a. The plurality of infrared reflective particles 14a, in the first SLML 16, can have an average particle size D50 less than 400 nm, for example, from about 1 nm to about 399 nm, and as a further example, from about 5 nm to about 350 nm. In this manner, the optical device 10 can be a directional reflector of infrared light. If the plurality of infrared reflective particles dispersed in the SLML 16 has an average particle size D50 greater than 700 nm, then the optical device 10 cannot orient the infrared light 20.

Figure 3:
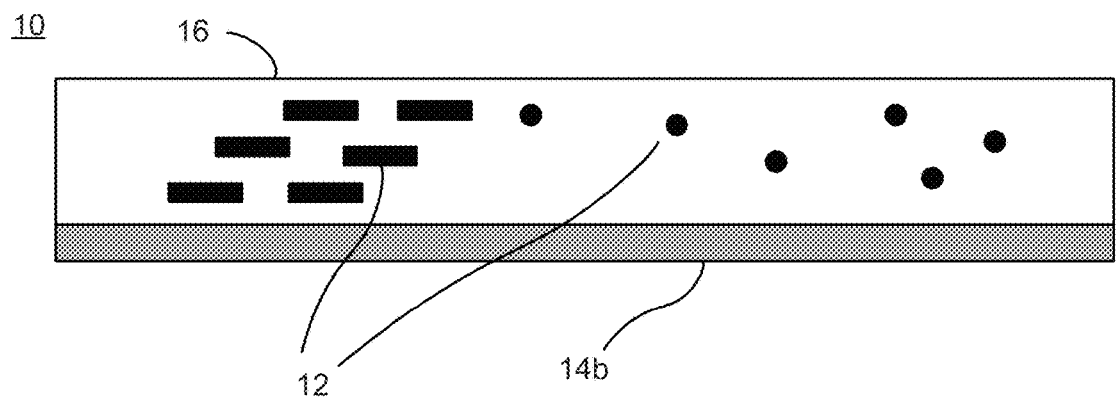
FIG. 3 illustrates a cross-section of an optical device according to another aspect of the invention.
Figure 7:
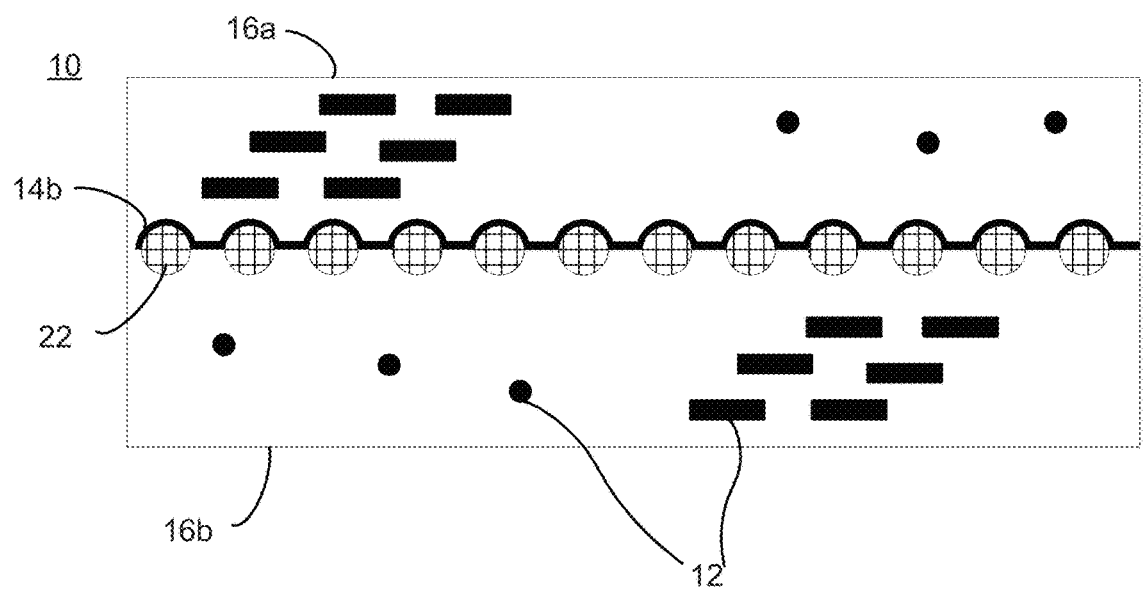
FIG. 7 illustrate a cross-section of an optical device according to another aspect of the invention.

The infrared reflective material can be a single piece of material forming a layer 14b. For example, the at least one infrared reflective material can be an infrared reflective layer 14b, such as in a continuous form, as shown in FIGS. 1, 3, 4, 5, 7, and 8. For example, the infrared reflective material can be a single, continuous layer forming an infrared reflective layer 14b. The infrared reflective layer 14b can be adjacent to the SLML 16, as shown in FIGS. 1 and 3. In an aspect, the infrared reflective layer 14b can be between a first SLML 16a, and a second SLML 16b, as shown in FIGS. 4, 5, 7 and 8. The infrared reflective layer 14b can conform to a microstructured layer, as shown in FIG. 7. In an aspect, the optical device 10 can include an infrared reflective layer

14*b* made of a metal, in which the optical device 10 is a directional or oriented reflector of infrared light. The infrared transparent particles can provide an appearance of color in the visible wavelength range while being transparent in the infrared wavelength range.

The at least one infrared reflective material can be an infrared reflective layer 14*c* in a discontinuous form, as shown in FIGS. 6A and 6B. The discontinuous form can be the plurality of infrared reflective particles present on a surface of the first SLML 16 to form a layer 14*c*. The plurality of infrared reflective particles, on a surface of the first SLML 16*a* to form a layer 14*c*, can have an average particle size D50 greater than 400 nm, for example, from about 401 nm to about 5000 nm, and as a further example, from about 450 nm to about 3500 nm. If the plurality of infrared reflective particles 14*a* have an average particle size D50 smaller than 700 nm, then the optical device 10 can not diffuse reflection of the infrared light 20. For example, the optical device 10 can include a first SLML 16 with a layer of a plurality of titanium dioxide particles on a surface of the first SLML 16, in which the optical device 10 is a diffuse reflector of infrared light.

The plurality of infrared reflective particles formed in a layer 14*c* can be present in a carrier, as shown in FIG. 6B. The carrier can be a host material, as discussed herein relative to the SLML. In another aspect, the carrier can be a solvent. Non-limiting examples of a solvent can include acetates, such as ethyl acetate, propyl acetate, and butyl acetate; acetone; water; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof.

Figure 4:
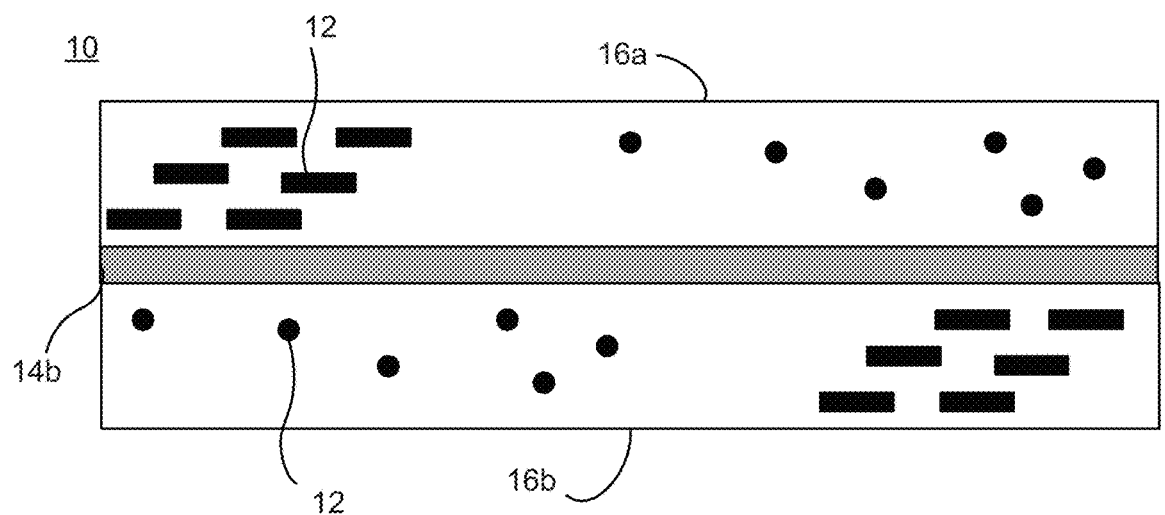
FIG. 4 illustrates a cross-section of an optical device according to another aspect of the invention.

The optical device 10 can be any and all combinations of an SLML 16 with infrared transparent particles 12 and at least one infrared reflective material 14 (*a, b, c*). FIG. 1 is an optical device 10 including an SLML 16 with infrared transparent particles (particles and/or platelets) 12 and infrared reflective particles (particles and/or platelets) dispersed therein; and an infrared reflective layer 14*b* adjacent to the SLML 16. FIG. 2 is an optical device 10 including an SLML 16 with infrared transparent particles (particles and/or platelets) 12 and infrared reflective particles (particles and/or platelets) dispersed therein. FIG. 3 is an optical device 10 including an SLML 16 with infrared transparent particles (particles and/or platelets) 12 dispersed therein; and an infrared reflective layer 14*b* adjacent to the SLML 16. FIG. 4 is similar to FIG. 3, but the infrared reflective layer 14*b* is between a first SLML 16*a* and a second SLML 16*b*. FIG. 5 is similar to FIG. 1, but the infrared reflective layer 14*b* is between a first SLML 16*a* and a second SLML 16*b*. FIGS. 6A and 6B illustrate an optical device 10 including a SLML 16 with infrared transparent particles (particles and/or platelets) 12 dispersed therein; and an infrared reflective material in the form of a plurality of particles forming a discontinuous layer 14*c*, optionally in a carrier, as shown in FIG. 6B.

FIG. 7 illustrates another optical device 10 having a first SLML 16*a* comprising infrared transparent particles 12, a second SLML 16*b* comprising infrared transparent particles 12; and at least one reflective material 14*b*. The at least one infrared reflective material is an infrared reflective layer. In particular, the infrared reflective layer 14*b* is a single continuous piece of infrared reflective material located between the first SLML 16*a* and the second SLML 16*b*. The infrared reflective material can be present on a plurality of beads 22 or any other microstructured surface. The beads 22 or microstructured surface can enable the infrared reflective material 14*b* to provide diffuse reflection of infrared light. In an aspect, the beads 22 can be embedded in a carrier between the first SLML 16*a* and the second SLML 16*b*.

Figure 8:
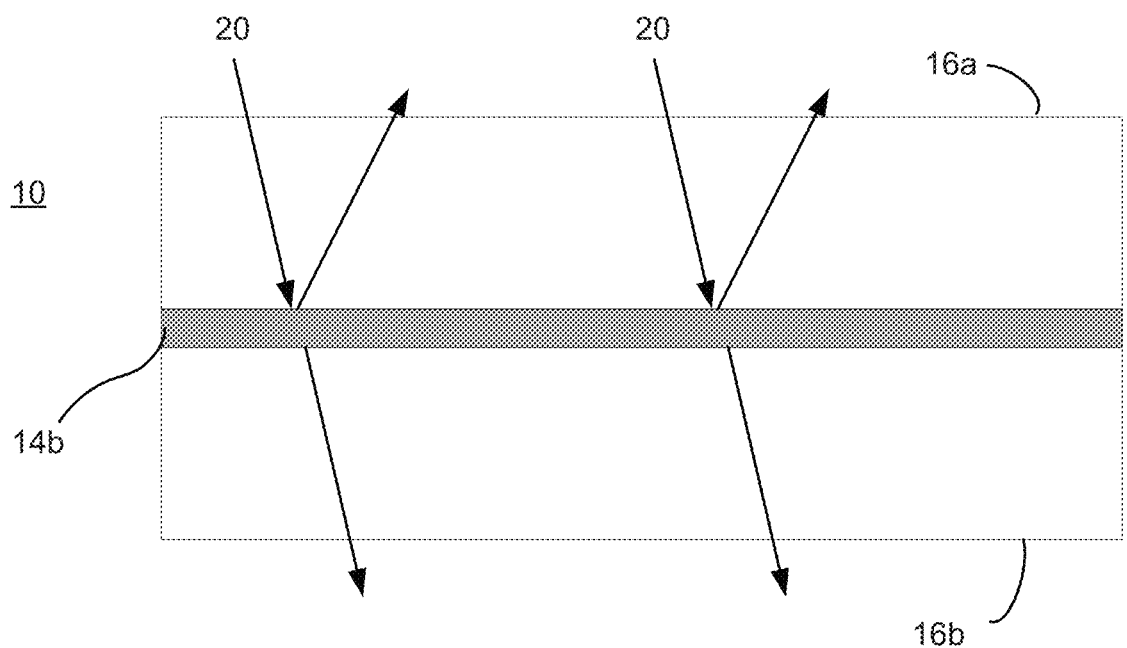
FIG. 8 illustrate a cross-section of an optical device according to another aspect of the invention.

FIG. 8 illustrates an optical device 10 including a first SLML 16*a*, a second SLML 16*b*, and an infrared reflector layer 14*b* between them. The infrared reflector layer 14*b* can have a physical thickness that is minimal, for example, having an optical density (OD) ranging from about 1 to about 2, so that the infrared reflector layer 14*b* can transmit the Radar K and W bands used for automotive short and long range radar sensors. The chosen thickness of the reflector layer allows sufficient transmission of Radar K and W bands while providing metallic appearance. Colored appearance of the device can be achieved by adding selective light modulating particles to layers 16*a* and 16*b*.

There is also disclosed a method of making an optical device comprising depositing, on a substrate, at least one infrared reflective material chosen from an infrared reflective layer and a plurality of infrared reflective particles; and depositing onto the at least one infrared reflective material a first selective light modulating layer including infrared transparent particles. The method also includes depositing, between the at least one infrared reflective material and the substrate, a second selective light modulating layer on an opposite surface of the at least one infrared reflective material from the first selective light modulating layer.

In another aspect, there is disclosed a method of making an optical device including depositing a carrier including a plurality of beads; drying the carrier including beads to form a microstructured layer; applying an infrared reflective layer to the dried microstructured layer; and depositing a first selective light modulating layer to the infrared reflective layer. The infrared reflective layer can conform to the microstructured layer. The step of depositing the first selective light modulating layer can include a liquid coating process. The method can further include, before the depositing of the carrier including beads, a step of depositing a second SLML layer.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a device and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An optical device, comprising:
    a first selective light modulator layer comprising infrared transparent particles;
    a microstructured layer including a plurality of beads; and
    an infrared reflective layer in a continuous form between the first selective light modulator layer and the microstructured layer,
    wherein the infrared reflective layer is coated on the beads and is configured to conform to the microstructured layer to provide Lambertian reflection of infrared light; and wherein the beads are between the first selective light modulator layer and a second selective light modulator layer.

2. The optical device of claim 1, wherein the infrared transparent particles include particles of perylene bisimide, azomethine, Prussian blue, iron oxide, azurite, silicon, antimony, tin oxide, and combinations thereof.

3. The optical device of claim 1, wherein the second selective light modulator layer is the same or different from the first selective light modulator layer.

4. The optical device of claim 1, wherein the beads are embedded in a carrier layer between the first selective light modulator layer and the second selective light modulator layer.

5. The optical device of claim 1, wherein the infrared transparent particles provide a colored appearance in a visible spectrum.

6. The optical device of claim 1, wherein the infrared transparent particles include particles of barium fluoride, potassium bromide, caesium iodide, potassium chloride, cadmium telluride, sapphire, calcium fluoride, gallium arsenide, sodium chloride, germanium, fused silica, magnesium fluoride, zinc sulfide, zinc selenide, and combinations thereof.

7. The optical device of claim 1, wherein the infrared reflective layer is a single piece of material.

8. The optical device of claim 1, wherein the infrared reflective layer has an optical density ranging from about 1 to about 2.

9. The optical device of claim 1, wherein the first selective light modulator layer is patterned to form a non-planar surface.

10. An optical device, comprising:
    a first selective light modulator layer comprising a plurality of infrared transparent particles of any shape having an aspect ratio other than one-to-one;
    a microstructured layer to provide Lambertian reflection of infrared light, the microstructured layer including a plurality of beads; and
    an infrared reflective layer on a surface of the first selective light modulator layer,
    wherein the infrared reflective layer is in a discontinuous form, the discontinuous form being a plurality of infrared reflective particles on the surface of the first selective light modulator layer, wherein the plurality of infrared reflective particles have an average D50 particle size ranging from greater than 700 nm to about 5000 nm.

11. The optical device of claim 10, wherein the plurality of infrared reflective particles is present in a carrier.